US006969108B2

(12) United States Patent  
Fukumoto et al.

(10) Patent No.: US 6,969,108 B2
(45) Date of Patent: Nov. 29, 2005

(54) VEHICULAR DOOR

(75) Inventors: Ryoichi Fukumoto, Nagoya (JP); Katsuhisa Yamada, Toyota (JP); Masayuki Uchitsunemi, Chiryu (JP); Kenji Kobashi, Toyota (JP); Shinji Okada, Toyota (JP); Katsuaki Maruyama, Toyota (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 10/777,106

(22) Filed: Feb. 13, 2004

(65) Prior Publication Data

US 2005/0046230 A1    Mar. 3, 2005

Related U.S. Application Data

(63) Continuation of application No. 10/442,270, filed on May 21, 2003, now abandoned, which is a continuation of application No. 10/253,533, filed on Sep. 25, 2002, now abandoned.

(30) Foreign Application Priority Data

Sep. 26, 2001 (JP) .............................. 2001-294133

(51) Int. Cl.$^7$ ................................................ B60J 5/06
(52) U.S. Cl. ...................................................... 296/155
(58) Field of Search ............................. 296/155, 146.2, 296/146.1, 147, 151; 49/502

(56) References Cited

U.S. PATENT DOCUMENTS

| | | | | |
|---|---|---|---|---|
| 5,581,952 A | * | 12/1996 | Kapes et al. ................ | 49/502 |
| 5,819,473 A | * | 10/1998 | Hashimoto et al. .......... | 49/502 |
| 5,931,682 A | * | 8/1999 | Takiguchi et al. ........... | 439/34 |
| 6,076,882 A | * | 6/2000 | Szerdahelyi et al. ...... | 296/146.1 |
| 6,101,765 A | * | 8/2000 | Hashimoto et al. .......... | 49/502 |
| 6,185,874 B1 | * | 2/2001 | Barrero Serrano et al. ... | 49/502 |
| 6,192,632 B1 | * | 2/2001 | Medebach et al. ........... | 49/502 |
| 6,381,906 B1 | * | 5/2002 | Pacella et al. ............... | 49/502 |
| 6,397,524 B1 | * | 6/2002 | Sakaguchi et al. ........... | 49/375 |
| 6,449,907 B2 | * | 9/2002 | Nishikawa et al. .......... | 49/502 |
| 6,698,140 B2 | * | 3/2004 | Tatsumi et al. .............. | 49/502 |
| 6,823,628 B2 | * | 11/2004 | Morrison et al. ............. | 49/502 |
| 2002/0046503 A1 | * | 4/2002 | Mersch ........................ | 49/502 |
| 2002/0095870 A1 | * | 7/2002 | Praud et al. .................. | 49/502 |
| 2003/0009948 A1 | * | 1/2003 | Nishikawa et al. .......... | 49/502 |
| 2003/0097797 A1 | * | 5/2003 | Cucchiara et al. ........... | 49/502 |
| 2003/0097798 A1 | * | 5/2003 | Staser ......................... | 49/502 |
| 2003/0218356 A1 | * | 11/2003 | Emerling et al. ........ | 296/146.1 |

OTHER PUBLICATIONS

Estima T/L Service Manual, issued on Jan. 2000 by Toyota Motor Corporation.

* cited by examiner

Primary Examiner—H. Gutman
(74) Attorney, Agent, or Firm—Finnegan, Henderson, Farabow, Garrett & Dunner, LLP

(57) ABSTRACT

A door for a motor vehicle includes an outer panel and an inner panel in which window portions are formed at their upper side region and which are connected at their peripheral portions, a space which is formed between the lower side region of the outer panel and the lower side region of the inner panel and in which a window glass for opening and closing the window portions is disposed so as to be able to move up and down, a module mounting opening formed on the lower side region of the inner panel and a module structure constituted by mounting a plural functional components to a module base, wherein the module base is fluid-tightly fixed to the module mounting opening at its peripheral portion and the module structure is mounted on the inner panel.

6 Claims, 17 Drawing Sheets

VEHICULAR DOOR

This is a continuation of application Ser. No. 10/442,270, filed May 21, 2003, now abandoned which is a continuation of application Ser. No. 10/253,533, filed Sep. 25, 2002, now abandoned which is incorporated herein by reference.

BACKGROUND OF THE INVENTION

1. Field of the Invention

The present invention relates to a door for a motor vehicle.

2. Description of the Related Art

As a conventional door for a motor vehicle, particularly a conventional sliding door for a motor vehicle, a door stated in "Estima T/L Service manual" issued on January 2000 by TOYOTA MOTOR CORPORATION is known. As shown in FIG. 16 and FIG. 17, in this door, an outer panel having a window portion formed at its upper side region and an inner panel having a window portion formed at its upper side portion are opposed and are connected at their peripheral portions and a space is formed between the lower side region of the outer panel and the lower side region of the inner panel and a window glass which opens and closes the window portions is disposed in the space so as to be able to move up and down.

As shown in FIGS. 16 and 17, an inside handle 1 operated for opening and closing the door, a remote control mechanism 5 for transmitting the movement of the inside handle 1 and an outside handle 4 to pole members of latch mechanism 2, 3, for maintaining the door in a closing state by engaging the door with a body, a locking actuator for operating an engagement and disengagement mechanism provided on the remote control mechanism 5 for being intermittent a path transmitting the movement of the inside handle 1 and the outside handle 4 to the pole members and so on are mounted at the inside of the inner panel, and a window regulator 7 for moving up and down the window glass and the latch mechanisms 2, 3 are mounted at the outside of inner panel.

In the prior sliding door for a vehicle, as mentioned above, since a great number of functional components are mounted on the inner panel through brackets, the number of man-hour in assembling process of a vehicle and the number of part increase and the weight of the door and the cost increase. Further, since a moving up and down actuator 8 of the window regulator 7 is mounted at the outside of the inner panel, the waterproofing becomes insufficient and there was a case that the insufficient waterproofing causes a malfunction of the moving up and down actuator 8 which is an electrical part.

SUMMARY OF THE INVENTION

It is an object of the present invention to provide a vehicular door which can prevent the prior drawbacks.

According to the present invention, a vehicular door includes an outer panel and an inner panel in which window portions are formed at their upper side region and which are connected at their peripheral portions, a space which is formed between the lower side region of the outer panel and the lower side region of the inner panel and in which a window glass for opening and closing the window portions is disposed so as to be able to move up and down, a module mounting opening formed on the lower side region of the inner panel and a module structure constituted by mounting a plural functional components including at least a remote control mechanism for transmitting a movement of an inside handle operated for opening and closing the door to a latch mechanism for maintaining the door in closing state by engaging the door with a body to the inside of compartment of a module base, wherein the module base is fluid-tightly fixed to the module mounting opening at its peripheral portion and the module structure is mounted on the inner panel.

DESCRIPTION OF THE PREFERRED EMBODIMENT

Figure 1:
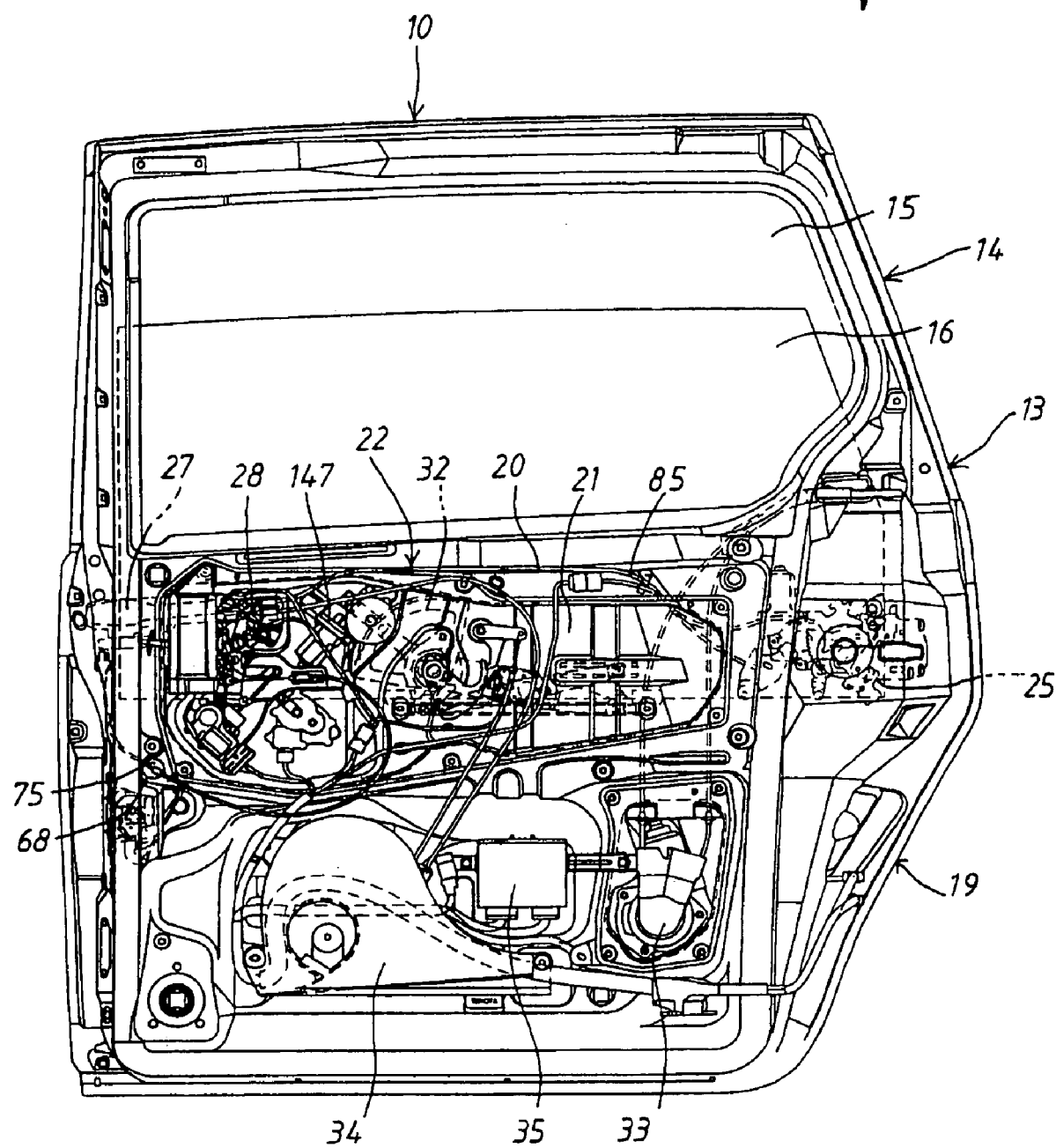
FIG. 1 is a front view of a door for a motor vehicle in which a trim is removed according to the present invention.
Figure 2:
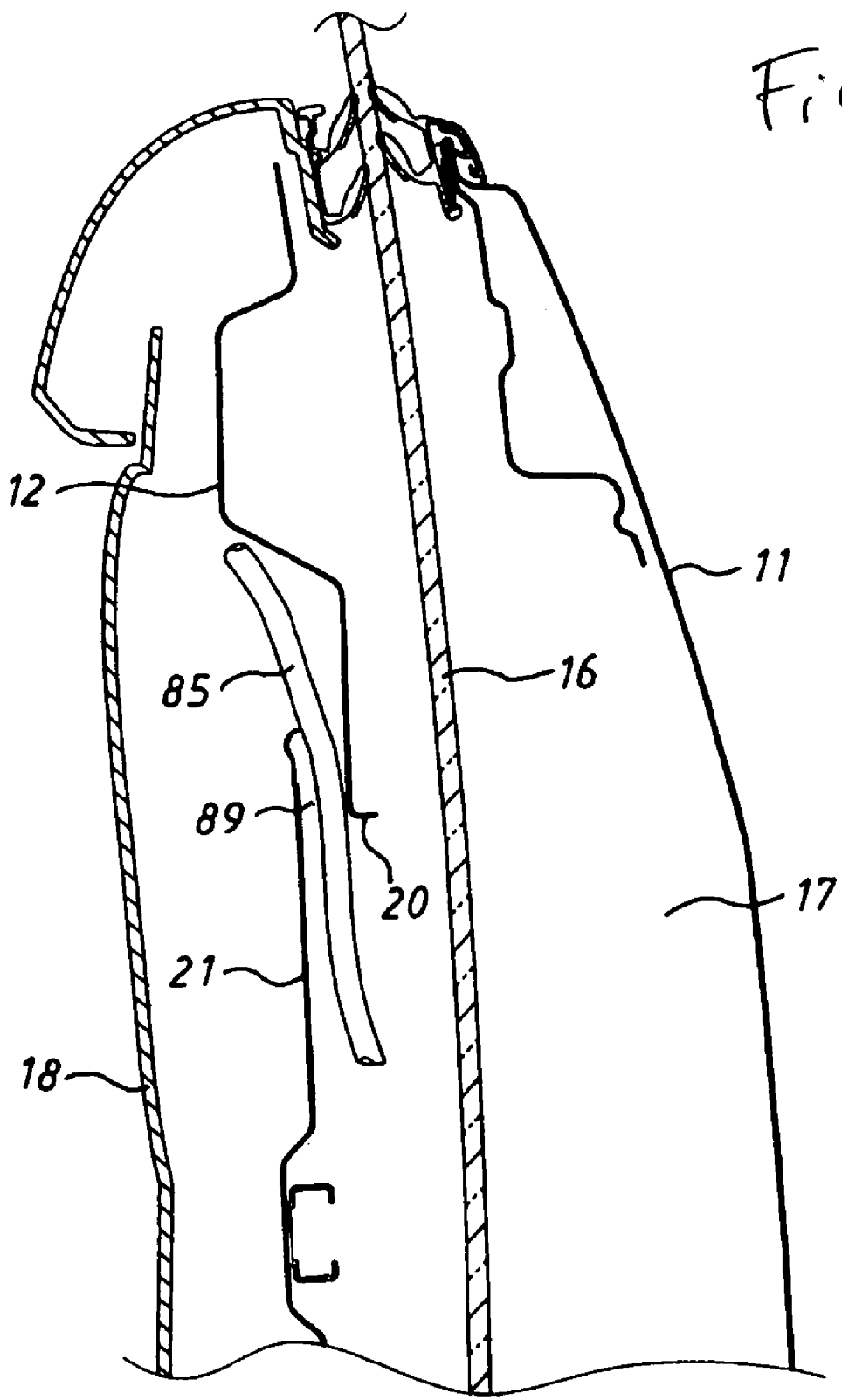
FIG. 2 is a partial sectional side view of the door for a motor vehicle.
Figure 3:
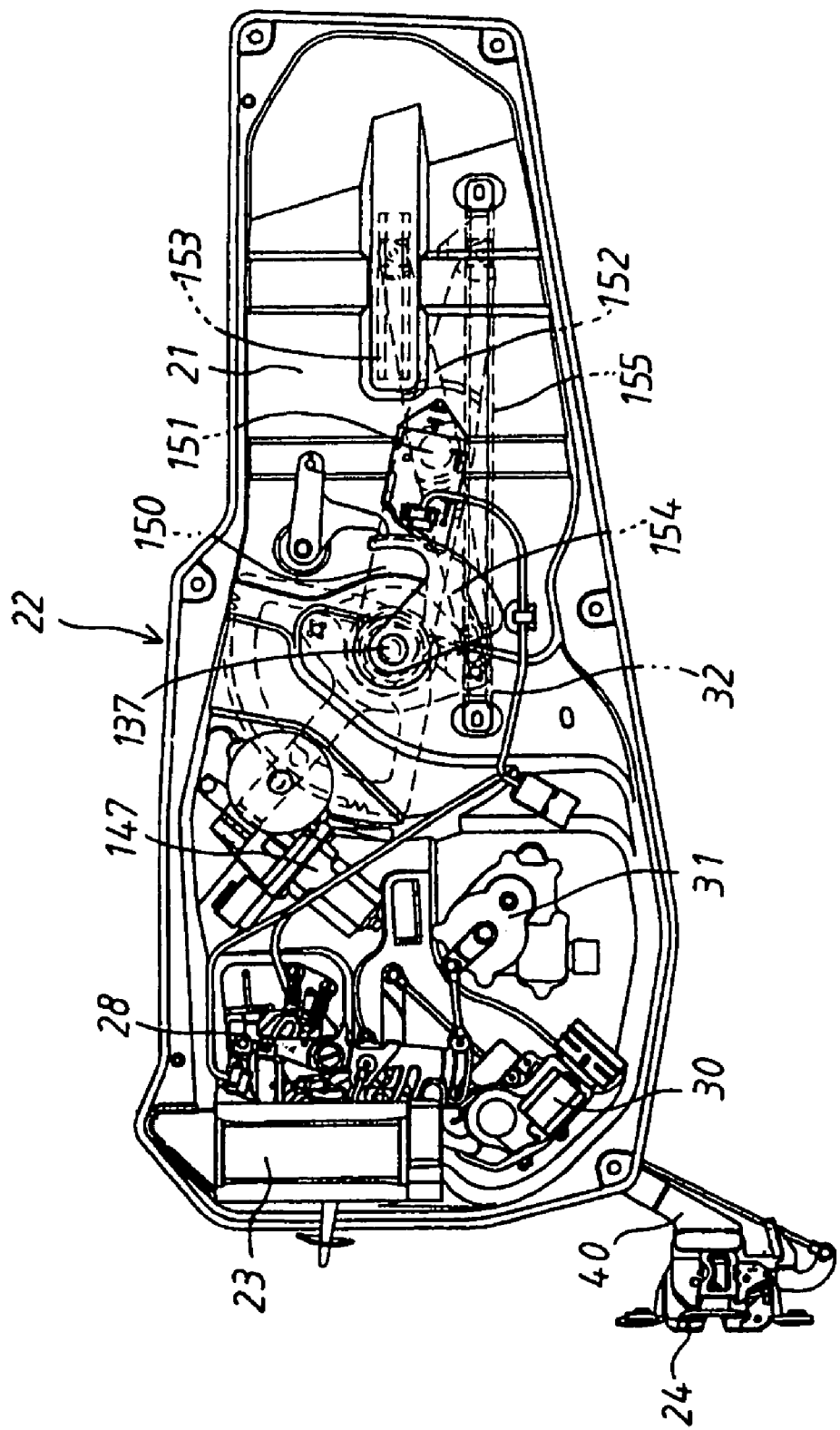
FIG. 3 is a front view of a module structure.

Hereinafter, a preferred embodiment of the present invention will be explained referring to drawings. FIG. 1 is a front view of a sliding type door 10 for a motor vehicle in which a trim is removed according to the present invention. FIG. 2 is a partial sectional side view of the sliding door 10 for a motor vehicle. FIG. 3 is a front view of a module structure 22 in which a plurality of functional components are mounted to a module base 21. As shown in FIG. 1 to FIG. 3, a window portion 15 penetrates an upper side region 14 of a door main body 13 which is formed by connecting between an outer panel 11 and an inner panel 12 at their peripheral portions and is provided. In a lower side region 19, a space 17 in which a window glass 16 for opening and closing the window portion 15 is disposed so as to be able to move up and down is formed between the outer panel 11 and the inner panel 12. The numeral 18 is a trim which is mounted at the inside of a compartment of the door main body 13. There is a case that water enters from outside of vehicle to the outside of a compartment which is outside of the inner panel 12, but water does not enter to the inside of the compartment which is inside.

A horizontally long module mounting opening 20 is formed near the window portion 15 at the lower side region 19 of the inner panel 12. A peripheral portion of a module base 21 is overlapped with a peripheral portion of the module mounting opening 20 and is fluid-tightly fixed thereto through a seal, and a module structure 22 constituted by mounting a plurality of functional components to the module base 21 is fixed to the inner panel 12 from the inside of the compartment. As shown in FIG. 3, the module structure 22 is constituted by mounting a inside handle 23 for opening and closing the sliding door 10, a front side latch mechanism 24 for maintaining the sliding door 10 in a closing state by engaging the sliding door 10 with a body, a remote control mechanism 28 for transmitting the movement of the inside handle 23 and an outside handle 27 to pole members of the front side latch mechanism 24 and a rear side latch mechanism 25, a locking actuator 30 for engaging and disengaging an engagement mechanism 29 provided on the remote control mechanism 28 for being intermittent a path transmitting the movement of the inside handle 23 and the outside handle 27 to the pole members of the front side latch mechanism 24 and the rear side latch mechanism 25, a release actuator 31 for entering the movement to the remote control mechanism 28 for moving the pole members of the front side latch mechanism 24 and the rear side latch mechanism 25 to a door opening allowed position, a window regulator 32 for moving up and down the window glass 16 and so on to the module base 21.

On the inner panel 12, besides the module structure 22, the rear side latch mechanism 25 which engages the sliding door 10 with the body and which maintains the sliding door 10 in the door closing state, a power sliding door driving, unit 33 for opening and closing automatically the sliding door 10, an electric supply device 34 for supplying the electric power from the body side to each actuator mounted on the sliding door 10, a computer 35 for controlling the operations of each actuators and so on are mounted. The outside handle 27 is mounted on the outer panel 11.

Figure 4:
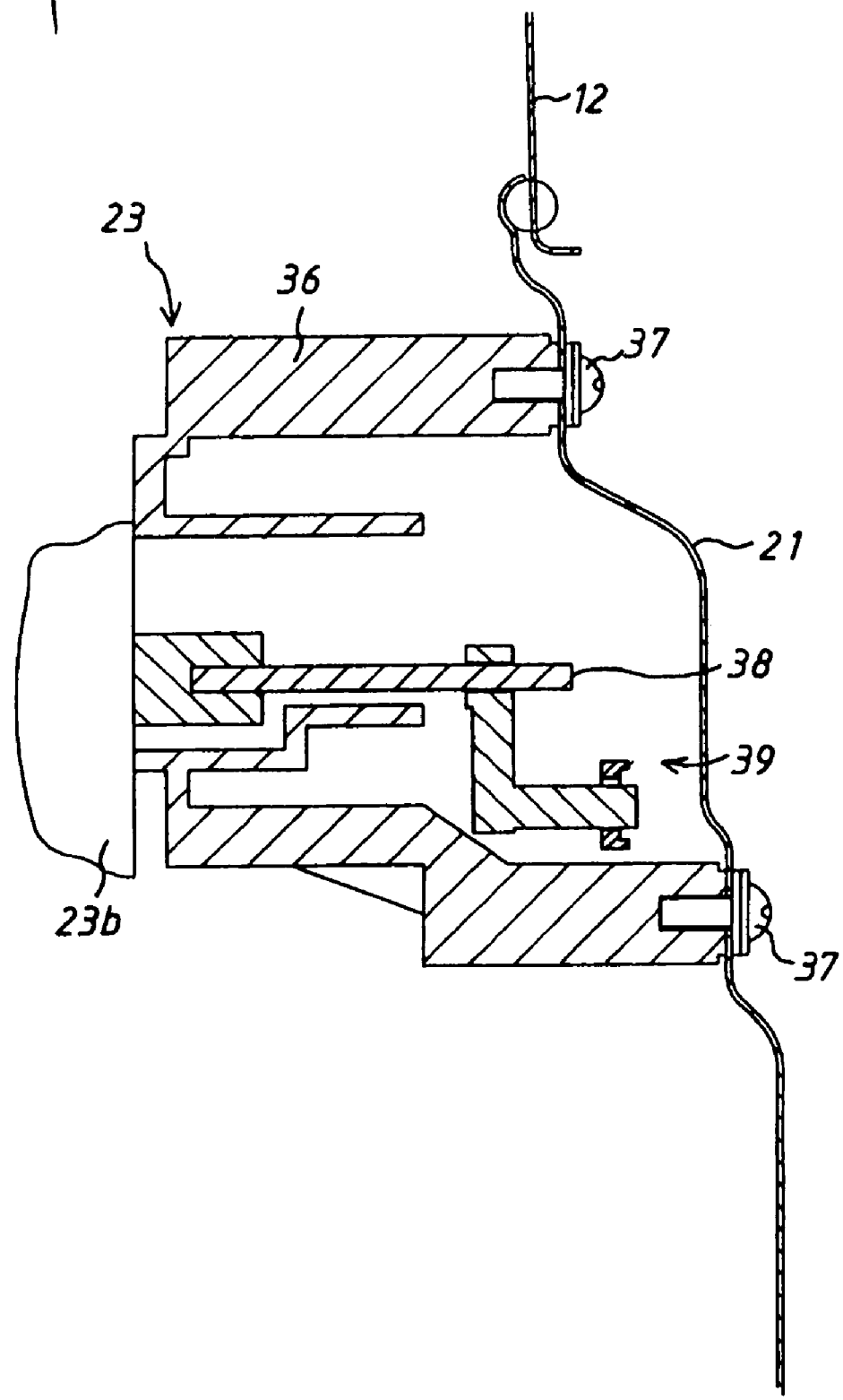
FIG. 4 is a cross-sectional view of an inside handle.
Figure 9:
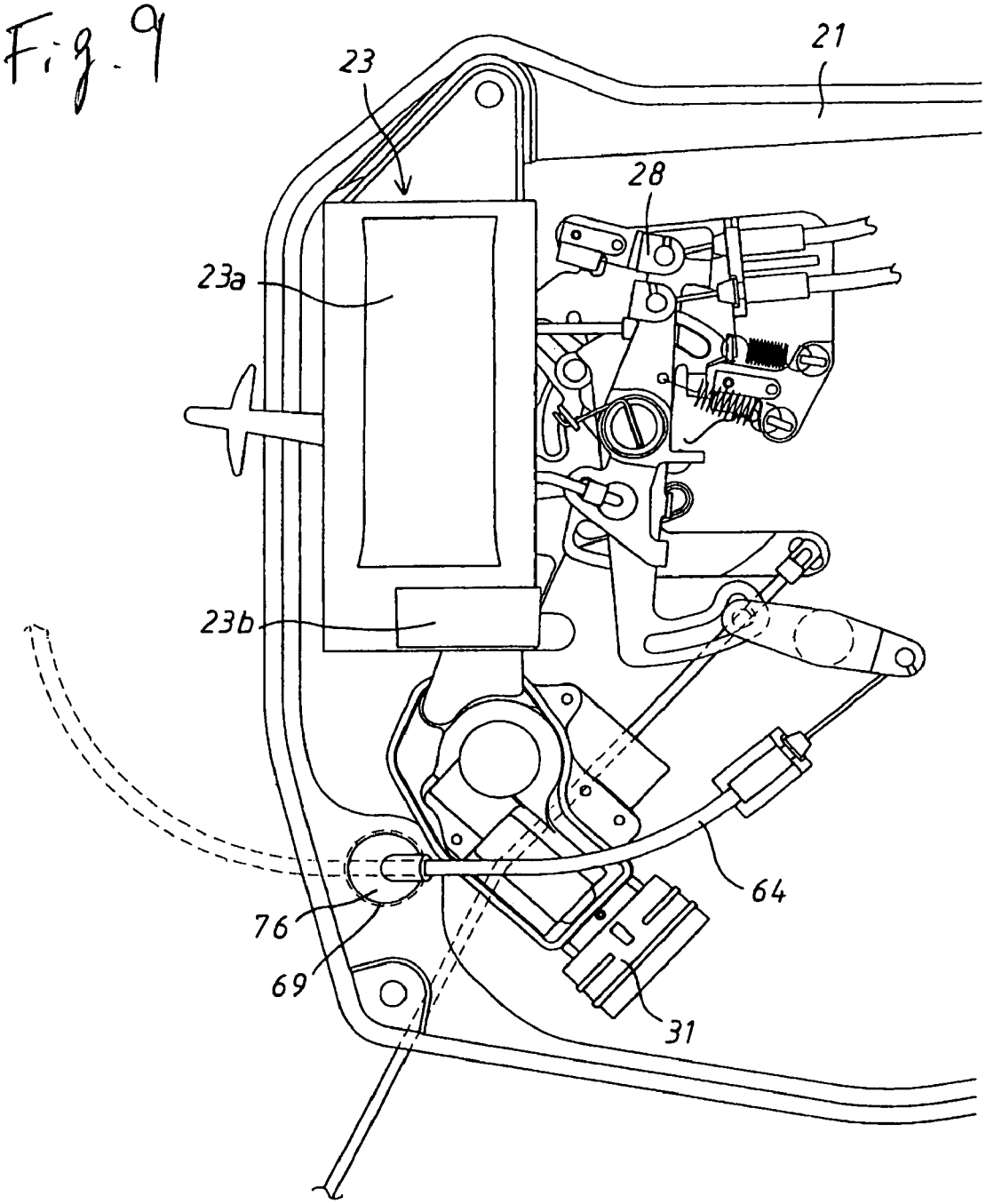
FIG. 9 is a diagram showing a condition in which the cable is introduced into the inside of compartment through a hole of the module base.

As shown in FIG. 4, a base 36 of the inside handle 23 nips the module base 21 between both side wall bottom surface and a head portion of a screw 37 screwed into a bottom surface and is mounted on a front side upper portion of the inside of the compartment of the module base 21. As shown in FIG. 9, a handle 23a of the inside handle 23 is pivoted on the base 36 so as to be able to swing. Further, a connecting bar 38 projected and provided on a locking knob 23b of the inside handle 23 is connected to the remote control mechanism 28 through a link mechanism 39 constituted by an output lever of the locking actuator 30 and a locking lever of the remote control mechanism 28.

The front side latch mechanism 24 for maintaining the sliding door 10 in the closing state by engaging the sliding door 10 with the body is fixed to a front side lower of the outside of the compartment of the module base 21 by a bracket 40. When a latch of the front side latch mechanism 24 engages with an engaging clasp fixed to the body side under the door closing state of the sliding door 10, the pole member engages with the latch and blocks the rotation of the latch. The pole member is pivoted so as to be able to swing. In order to move the front side latch mechanism 24 to the door opening allowed position, the movement of the inside handle 23 is transmitted to the front side latch mechanism 24 through the remote control mechanism 28. Namely, the inside handle 23 and the outside handle 27 are connected to the pole member of the front side latch mechanism 24 through the remote control mechanism 28. When the opening movement of the inside handle 23 toward the opening direction of the door or the movement of the outside handle 27 is transmitted under the engaged condition of the engagement mechanism 29, the pole member is swung to the door opening allowed position allowing the rotation of the latch, and the latch is rotated and is free to disengage from the engaging clasp, and the sliding door 10 can move toward the opening direction.

Figure 5:
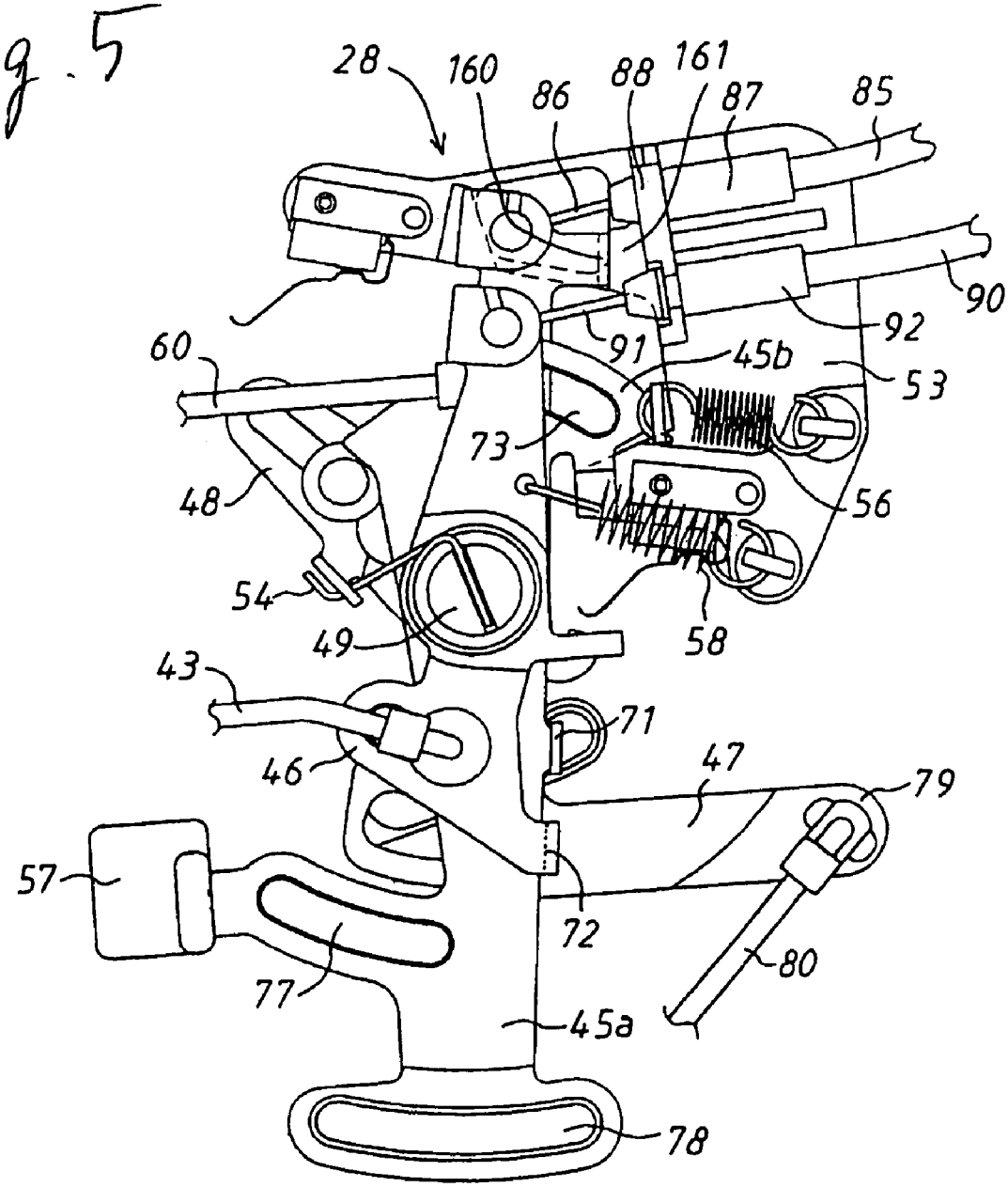
FIG. 5 is a front view of a remote control mechanism.
Figure 6:
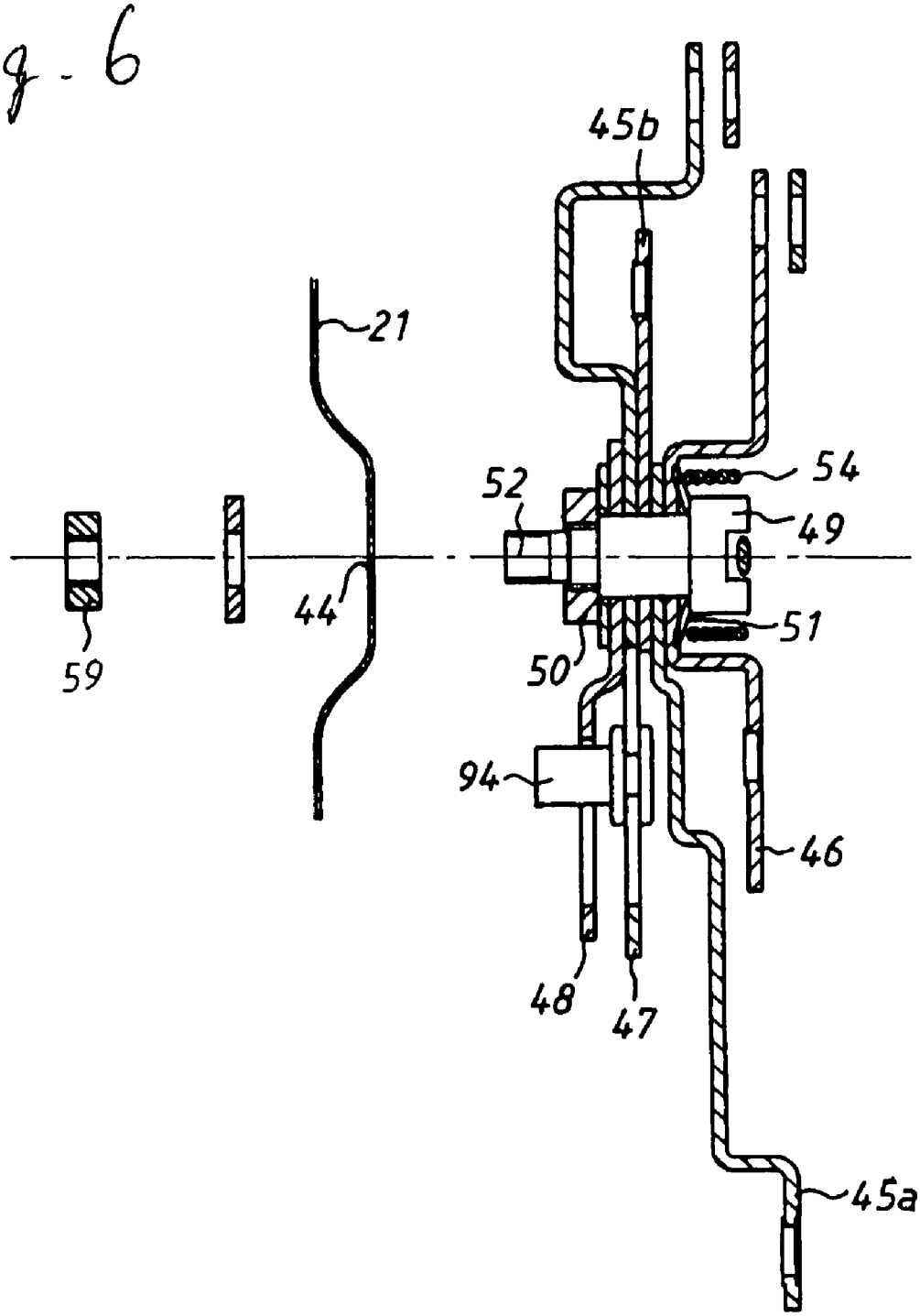
FIG. 6 is a sectional side view of the remote control mechanism.

As shown in FIG. 5 and FIG. 6, an outside door opening lever 45a, an inside door opening lever 45b, a door closing lever 46, a first lift lever 47 and a second lift lever 48 are piled up and are rotatably fitted on a central axis 49, and are nipped, between a head portion of the central axis 49 and a nut 50 screwed on a screw portion and is pressed with an appropriate force by an elastic force of a disc spring 51. A top end portion 52 of the central axis 49 is cut off the edges and a screw is formed thereon. The top end portion 52 is fitted into a hole 44 formed on the module base 21 and a nut 59 is screwed through a washer, and the central axis 49 is prevented from rotating and is fixed to the module base 21. A torque spring 54 is disposed between the central axis 49 and the second lift lever 48 and urges the second lift lever 48 so as to rotate clockwise in FIG. 5.

Figure 7:
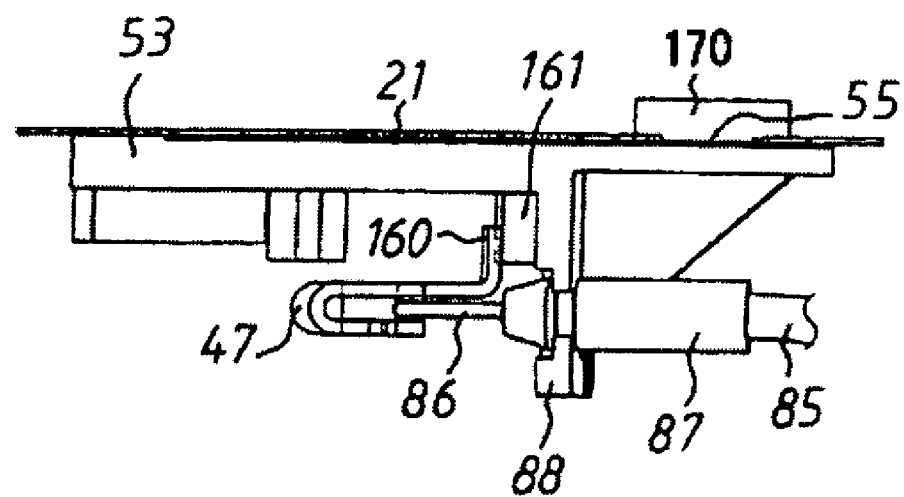
FIG. 7 is a diagram showing a mounting condition of a bracket to a module base.

The numeral 53 is resinous bracket. As shown in FIG. 7, a T-shaped projection 170 formed on a back surface is fitted into a T-shaped hole 55 formed on the module base 21 while aligning a transversal line portion and is moved toward the upper end of the longitudinal line of the hole 55, and both side portions and a lower end portion of the longitudinal line portion of the hole 55 are engaged with a slit having the same width as the thickness of the module base 21 which is formed on a foot of both side of the transversal line portion and the lower end of the longitudinal line portion of the T-shaped projection 170, the bracket 53 is contacted and fixed to the module base 21. A tension spring 56 which is disposed on a spring stopping portion of the bracket 53 urges the inside door opening lever 45b so as to rotate clockwise. The rotation of the inside door opening lever 45b clockwise is regulated by contacting a projection 162 (FIG. 11) with a stopper formed on the bracket 53. A tension spring 58 which is disposed on the spring stopping portion of the bracket 53 urges the door closing lever 46 so as to rotate clockwise. The rotation of the door closing lever 46 is regulated by contacting a projection 72 with the outside door opening lever 45a. The rotation of the outside door opening lever 45a is regulated by contacting with a stopper 57 made of resin. The stopper 57 is fixed to the module base 21 by the engagement of a T-shaped projecting portion with a T-shaped hole formed on the bracket 53.

Figure 8:
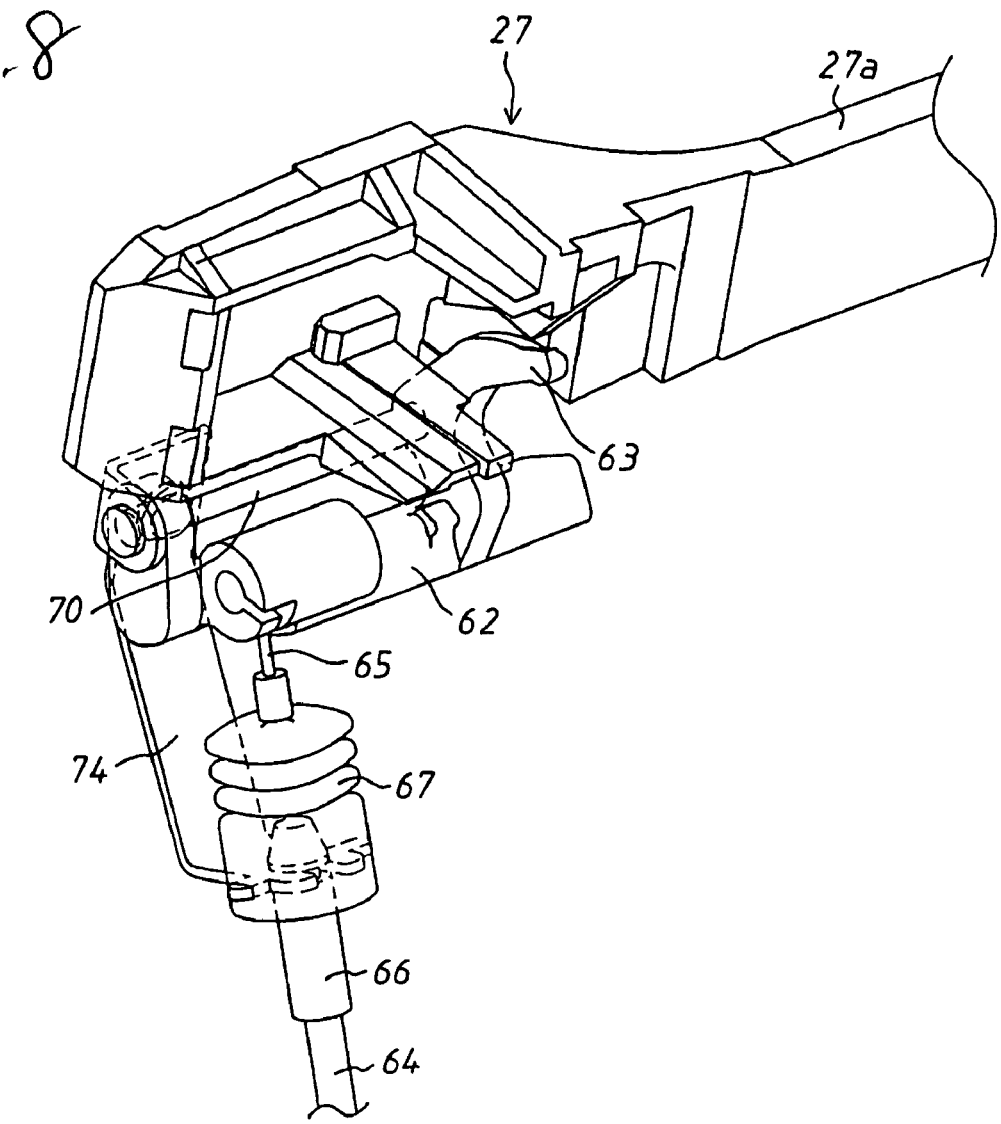
FIG. 8 is a diagram showing a mechanism for transmitting a movement of an outside handle to a cable.

The opening movement of the inside handle 23 is transmitted to an end portion of a long hole 73 of the inside door opening lever 45b by a link 60 and the door closing movement of the inside handle 23 is transmitted to a door closing lever 46 by a link 43. A handle of the outside handle 27 which is disposed in the horizontal direction is pivoted on the outer panel 11 at its rear end portion so as to be able to swing and presses an arm portion 63 of a swing link 62 shown in FIG. 8 at its front end portion, and rotates the swing link 62. The swing link 62 is supported on a base 27a of the outside handle 27 by a pin 70 so as to be able to rotate around a horizontal axis and a wire 65 of a cable 64 is connected to a free end thereof from lower side. An upper end portion of a coating tube 66 of the cable 64 is fixed at the lower side of the free end of the swing link 62 by a cable stopper 74 fixed to the base 27a of the outside handle 27.

A bottom portion of an accordion seal 67 is fluid-tightly fixed to the wire 65 and a skirt portion covers an upper end portion of the coating tube 66 for waterproofing. Since the seal 67 is opened at its lower end and comings and goings of air is free, the resistance to expansion and contraction is small and it is able to smoothly move the outside handle 27 by small force. Since the movement of the outside handle 27 can be transmitted to the cable 64, the cable 64 passes the front side of the window glass 16 in the space 17 and is introduced easily to the inside of the compartment through a hole 68 (FIG. 1) formed on the inner panel 12 or a hole 69 (FIG. 9) formed on the module base 21. In the holes 68, 69, grommets 75, 76 in which the cable 64 passes are mounted for waterproofing. The wire 65 of the cable 64 is connected to a long hole 77 of the outside door opening lever 45a of the remote control mechanism 28. The coating tube 66 is fixed by a cable stopper fixed to the module base 21 while being opposite to the long hole 77. The release actuator 31 is connected to a long hole 78 formed on the outside door opening lever 45a.

Figure 10:
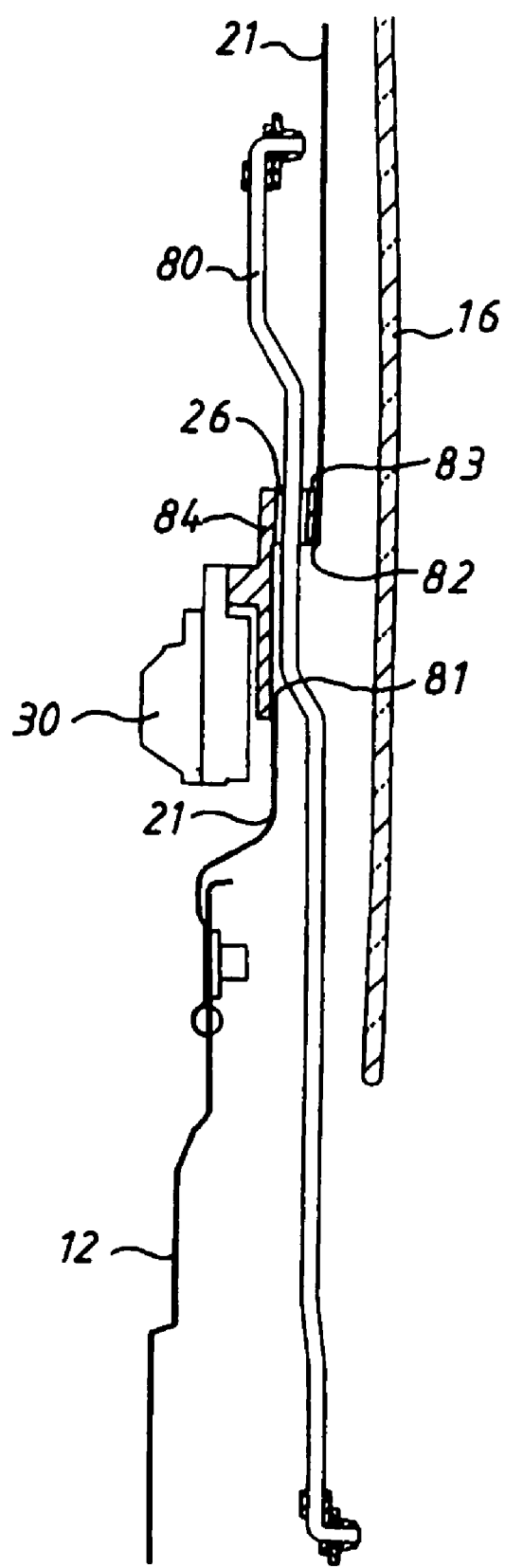
FIG. 10 is a diagram showing a condition in which a link is derived to the outside of compartment through a hole formed on the module base.

A link 80 is pivoted on a top end of an arm 79 of the first lift lever 47. As shown in FIG. 10, the link 80 is derived to the outside of the compartment through a communicating hole 81 formed on the module base 21 and is connected to the pole member of the front side latch mechanism 24. Namely, a rectangular step portion 82 which projects to the outside of the compartment at its upper portion is formed on the module base 21 and a communicating hole 81 is formed on the step portion 82. A block 84 in which a projection 83 overlapping with the step portion 82 is formed is fixed to the module base 21 so as to close fluid-tightly the communicating hole 81 by its peripheral portion. A hole 26 penetrates the projection 83 upward and downward and the link 80 which is a connecting member is derived to the outside of the compartment through the hole 26. Since the hole 26 is formed at upper side with respect to the communicating hole 81 of the module base 21 and is formed upward and downward at the outside of the compartment, water can be prevented from entering from the outside of the compartment to the inside of the compartment. The locking actuator 30 is mounted at the inside of the compartment of the block 84.

A wire 86 of the cable 85 is connected to an upper end of the first lift lever 47 and a coating tube 87 is fixed to a cable stopper 88 formed on the bracket 53. As shown in FIG. 2, the cable 85 being a connecting member is derived to the outside of the compartment through a hole 89 formed between the inner panel 12 and the module base 21 and is connected to the pole member of the rear side latch mechanism 25. The hole 89 is extended upward and down ward and is formed so as to isolate regionally the inner panel 12 from the module base 21 at a portion in which an upper side edge of the module mounting opening 20 is located lower than an upper side edge of the module base 21. Since the hole 89 is formed upward and downward at the outside of the compartment so that the upper side edge of the module mounting opening 20 is located lower, water can be prevented from entering from the outside of the compartment to the inside of the compartment. Thereby, it is able to transmit the opening movement of the inside handle 23 for moving the rear side latch mechanism 25 for maintaining the sliding door 10 in the closing state by engaging the sliding door 10 with the body to a door opening allowed state or the movement of the outside handle 27 to the rear side latch mechanism 25 through the remote control mechanism 28. The rotation of the first lift lever 47 clockwise is regulated by contacting a projection 160 of the first lift lever 47 to a stopper 161.

An upper end of the door closing lever 46 is connected to a wire 91 of a cable 90 and a coating tube 92 is fixed to a cable stopper 88 formed on the bracket 53. The cable 90 is connected to a pole member of a latch mechanism (not shown) for maintaining the opened sliding door 10 in the opening state by engaging the sliding door 10 with the body.

Figure 11:
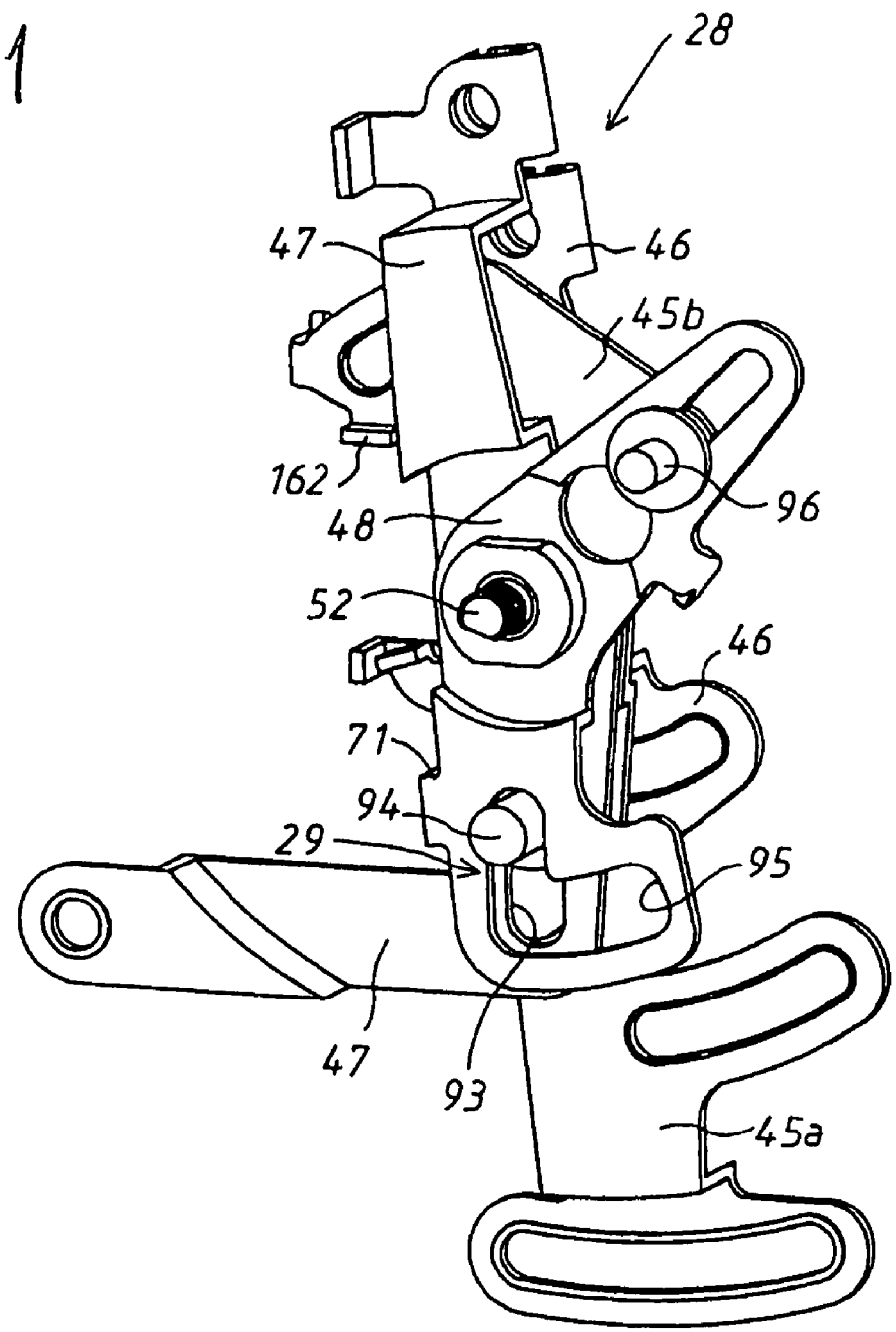
FIG. 11 is a diagram showing the remote control mechanism which is looked from its back face side.

The engagement mechanism 29 for being intermittent the path transmitting the opening movement of the inside handle 23 and the movement of the outside handle 27 to the pole members of the front side latch mechanism 24 and the rear side latch mechanism 25 is provided on the remote control mechanism 28. Namely, as shown in FIG. 5, FIG. 6 and FIG. 11 showing the remote control mechanism which is looked from its back face side, a locking pin 94 is slidably disposed in a long hole 93 which is formed in the first lift lever 47 in the turning radial direction. The locking pin 94 penetrates a L shaped groove 95 formed on the second lift lever 48 by bending in the turning radial direction and the turning circumferential direction and is connected to the locking actuator 30 through a link, and is connected to the locking knob 23b through the link mechanism 39. Thereby, in the condition that the locking pin 94 locates in a turning radius portion of the L shaped groove 95 by the locking actuator 30 or the locking knob 23b, when the inside door opening lever 45b or the outside door opening lever 45a is rotated counterclockwise in FIG. 5 by the opening movement of the inside handle 23 or the movement of the outside handle 27, the second lift lever 48 is rotated in the same direction by the inside door opening lever 45b through a child pin 96 or by the push movement of the projection 71 of the second lift lever 48 by the outside door opening lever 45a, the first lift lever 47 is rotated counterclockwise by the engagement between the locking pin 94 located at the turning radius portion of the L shaped groove 95 and the long hole 93. When the locking pin 94 is located at a turning circumferential portion of the L shaped groove 95, even though the second lift lever 48 is rotated counterclockwise by the inside door opening lever 45b or the outside door opening lever 45a, the locking pin 94 moves relatively in the turning circumferential portion oft the L shaped groove 95 is not rotated, and does not transmit the rotational movement to the first lift lever 47. The second lift lever 48 and the inside door opening lever 45b are connected by the child pin 96 moved by a child protect lever so as to be able to engage and disengage.

Figure 12:
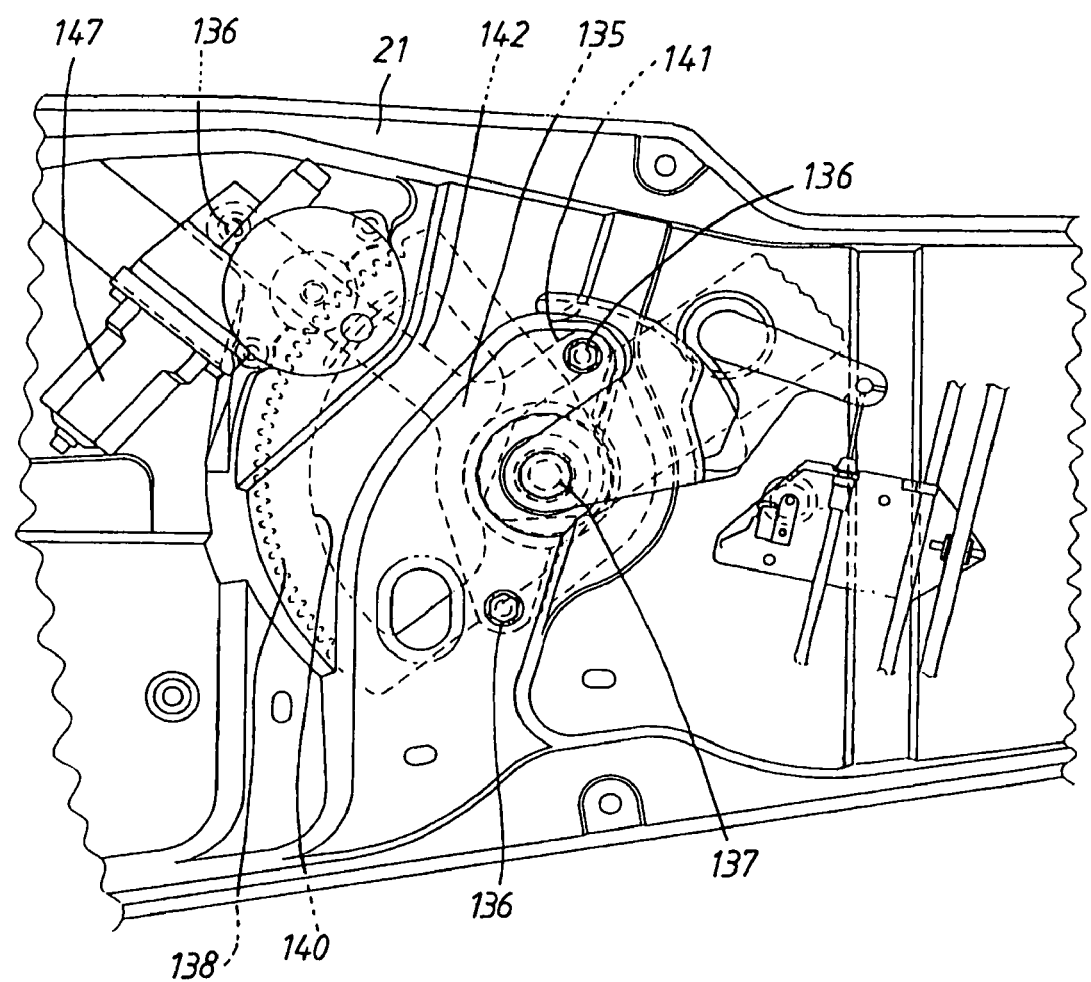
FIG. 12 is an enlarged view of an actuator part of a window regulator and a drive shaft part.
Figure 13:
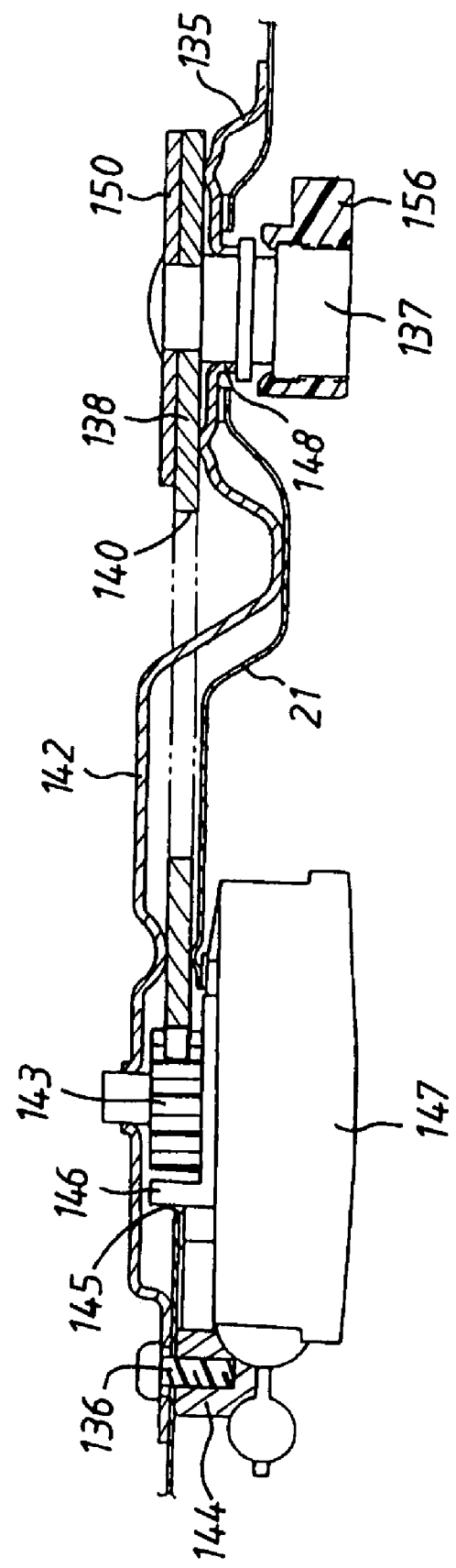
FIG. 13 is a sectional view of a mounting portion of the actuator part of the window regulator and the drive shaft part to the module base.
Figure 14:
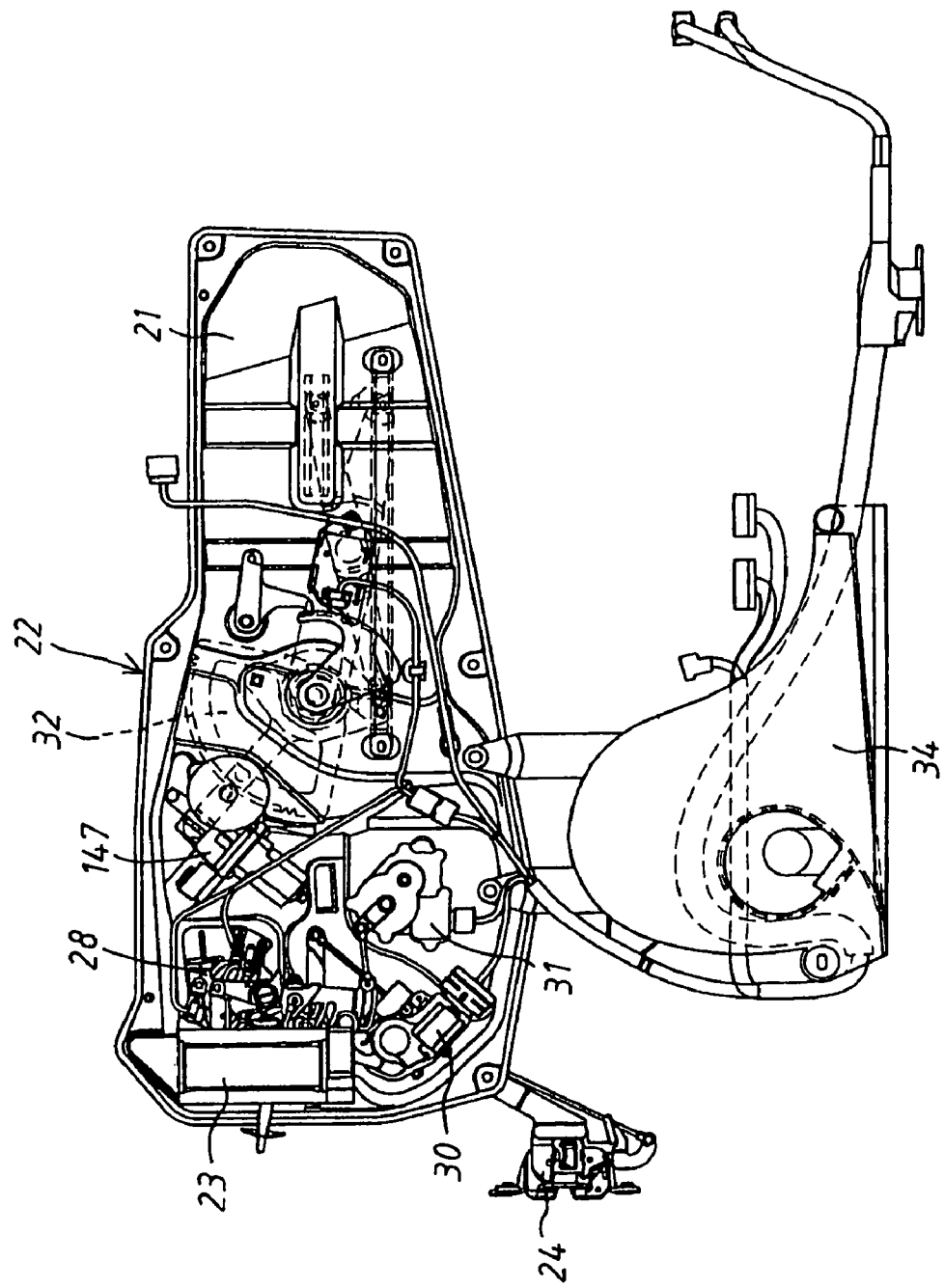
FIG. 14 is a front view of the module structure in which an electric supply device is mounted to the module base.

The window regulator 32 is mounted on the module base 21. As shown in FIG. 12 and FIG. 13, T shaped reinforcing plate 135 is fixed on a side face of outside of the compartment of the module base 21. The reinforcing plate 135 has minimum size in order to lighten the weight. Both ends of a top panel portion 141 of the reinforcing plate 135 are fixed to the module base 21 by screws 136. An inner edge of a bearing hole which is formed in a center portion of the top panel portion 141 is bent toward the inside of the compartment and a bearing portion 148 is formed, and a drive shaft 137 is rotatably supported. On an end portion of the drive shaft 137 which projects toward the outside of the compartment, a rotation center portion of a sector gear 138 and one end of the drive link 150 are fixed thereon so as to regulate the relative rotation. Both ends of the bearing portion 148 is nipped between a flange portion formed on the drive shaft 137 and the sector gear 138 and the movement in the axial direction of the drive shaft 137 is regulated. A strip-shaped portion 142 extended from the top panel portion 141 of the reinforcing plate 135 bends outside along the way and passes through a sectorial penetrating hole 140 formed on a center portion of the sector gear 138, and is positioned at the outside with respect to the sector gear 138. The strip-shaped portion 142 extends in parallel with the sector gear 138 and supports rotatably a shaft portion of a pinion 143 meshed with the sector gear 138 as an output member. The end portion of the strip-shaped portion 142 bends inside and overlaps with the module base 121. The screw 136 penetrates this overlapped portion and is screwed to a fixing seat 144 of a moving up and down actuator 147 which contacts with a side face of the inside of the compartment of the module base 121, and the end portion of the strip-shaped portion 142 is fixed to the module base 121. In a portion of the module base 121 which is opposite to the pinion 143, an opening 145 is formed and a mounting plate 146 is fixed so as to close the opening 145. The moving up and down actuator 147 including a motor and a speed reduction mechanism is mounted on the mounting plate 146 and an output shaft is connected to the pinion 143.

As shown in FIG. 3, on a center portion of the drive link 150 rotated with the sector gear 138 in a body, a pin 151 is rotatably supported and one end of a guide link 152 is fixed to an inner end of the pin 151 projected toward the module base 121 of the drive link 150. The other end of the guide link 152 is guided movably in the horizontal direction by a guide 153 which is fixed to the side face of the outside of the compartment of the module base 121 and whose height is the same as the drive shaft 137. One end of a support link 154 is fixed to an outer end of the pin 151 projected to the opposite side of the drive link 150 so as to extend the guide link 152. A top end portion of the drive link 150 and a top end portion of the support link 154 are guided movably in the horizontal direction by a guide rail 155 mounted on a lower end side surface of the window glass 16 and support the window glass 16. The drive link 150, the pin 151, the-guide link 152 and the support link 154 constitute a pair of links which are rotatably connected at the center portion in X configuration and are mounted to the module base 121 at the outside of compartment, and constitute a link mechanism for supporting the window glass 16 and for moving up and down the window glass 16.

Next, the assembling work and the operation of the sliding type door 10 for a motor vehicle according to the present invention is described. The remote control mechanism 28, the inside handle 23, the window regulator 32, the locking actuator 30, the release actuator 31 and so on are mounted on the module base 21, the mounted functional components are connected therebetween by the links and the module structure 22 are formed. In the assembling work of a motor vehicle, the handle of the outside handle 27 is mounted at the outside of the outer panel 11 and the base 27a of the outside handle 27 on which the swing link 62 is supported is mounted at the inside of the outer panel 11. The cable 64 is connected to the swing link 62, the cable 64 is introduced to inside of the compartment through the hole 68 or the hole 69 and is connected to the remote control mechanism 28. The link 80 which is connected to the front side latch mechanism 24 is introduced to the inside of the compartment through the hole 26 of the block 84, and the cable 85 and the wire harness which are connected to the rear side latch mechanism 25 are introduced to the inside of the compartment through the hole 89. In this condition, the module base 21 is mounted to the inner panel 12 so as to close the module mounting opening 20. The power sliding door driving unit 33, the electric supply device 34, the computer 35 and so on are mounted to the inner panel 12, and the connection of the cable, the electric wiring and so on are carried out and the trim 18 is mounted. As shown in FIG. 13, the electric supply device 34 may be mounted on the lower side of the module base 21.

When the sliding door 10 is not locked, the opening movement of the inside handle 23 and the movement of the outside handle 27 or the release actuator 31 are transmitted to the front side the latch mechanism 24 and the rear side latch mechanism 25 and the latch mechanisms are in the door opening allowed position, the sliding door 10 is able to move toward the open direction. When the door is closed, the door closing lever 46 is rotated by the closing movement of the inside handle 23 through the link 43 or by the movement of the outside handle 27, this movement is transmitted through the cable 90 to the latch mechanism for engaging the opened door 10 to the body and the latch mechanism is in the door closing allowed condition, the sliding door 10 is able to move toward the close direction.

Further, when the opening switch of the window glass 16 is operated, the motor of the moving up and down actuator 147 of the window regulator 32 is rotated toward the moving down direction of the window glass 16, the sector gear 138 is rotated by the pinion 143, the drive shaft 137 is rotated clockwise in FIG. 3, the drive link 150 is rotated in the same direction, the guide link 152 is guided by the guide 153 and is rotated counterclockwise while moving rightward in the horizontal direction, the support link 154 is rotated in the same direction, the guide rail 155 is moved downward and the window glass 16 is moved down.

Figure 15:
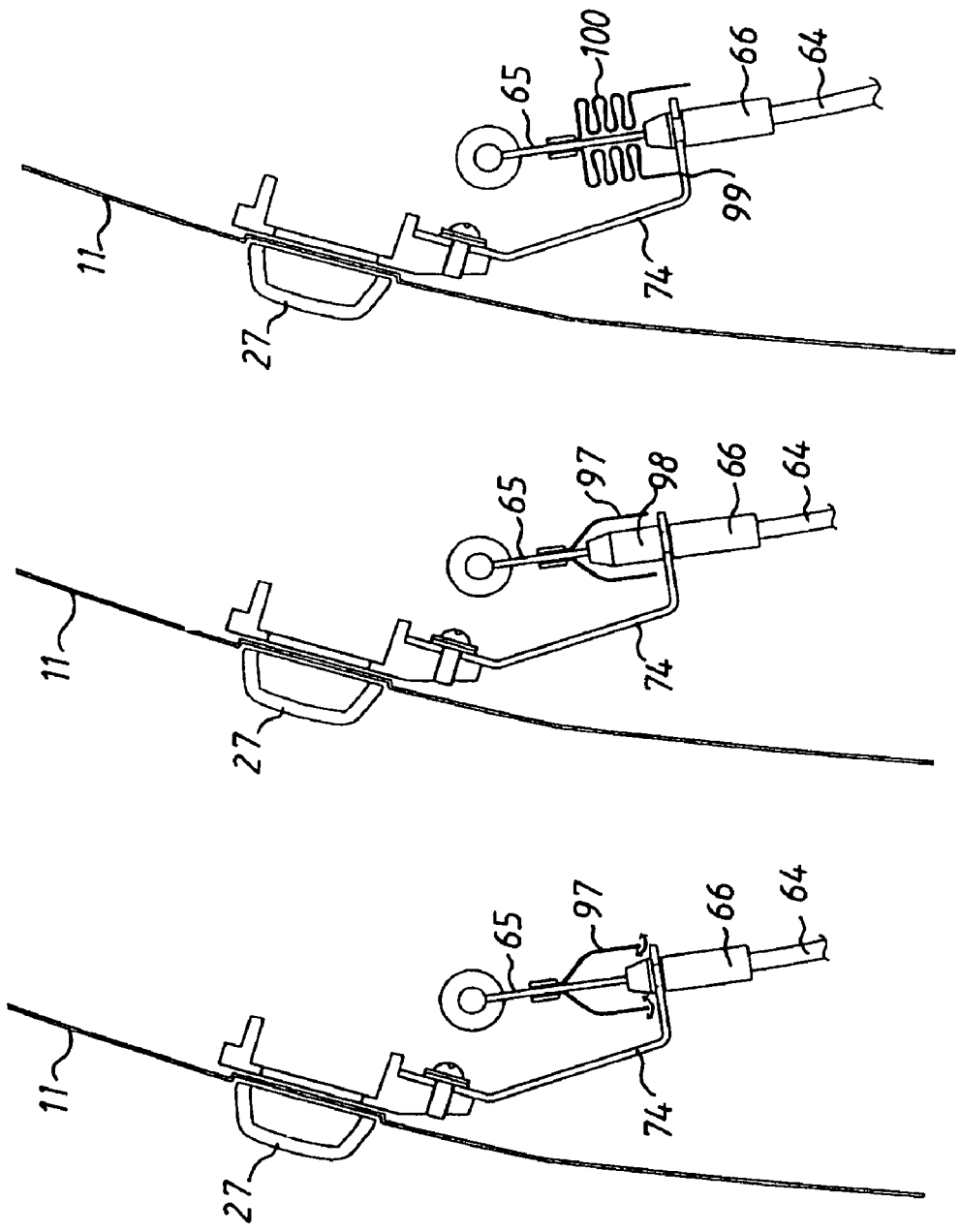
FIGS. 15(a) to 15(c) is a diagram showing a modification of a seal which waterproofs an end portion of the cable transmitted a movement of the outside handle.
Figure 16:
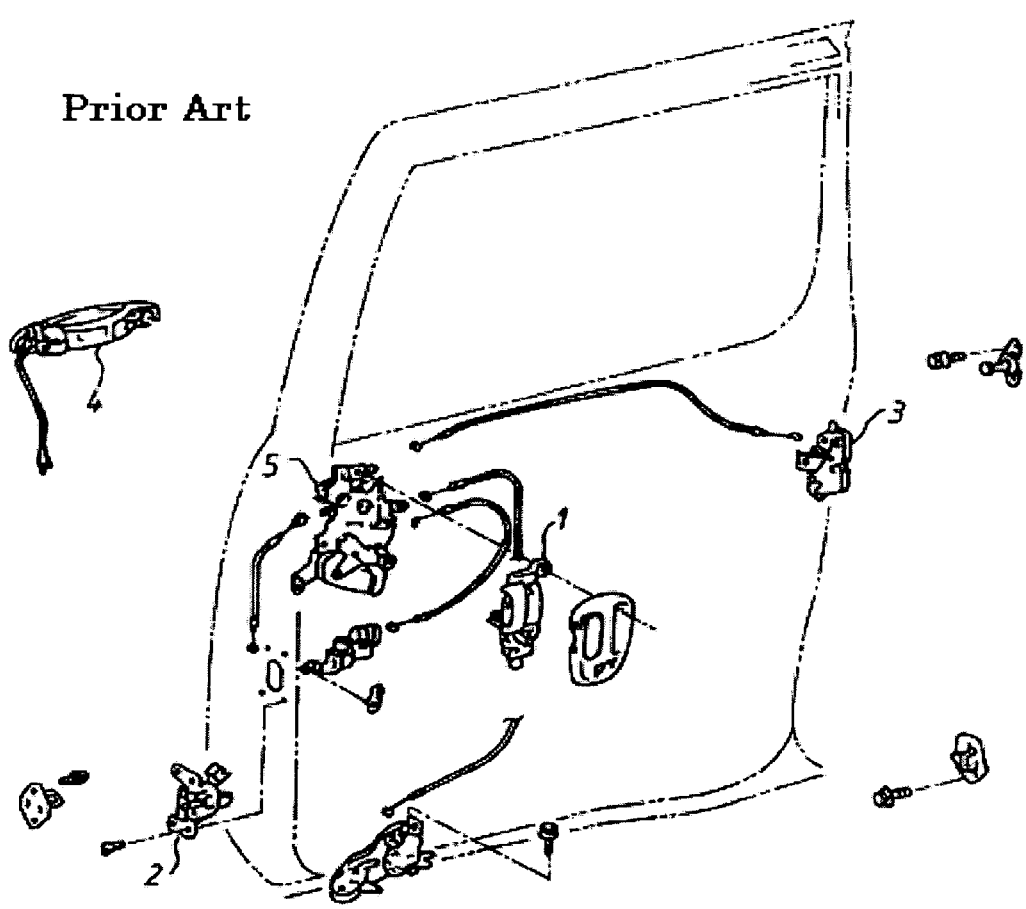
FIG. 16 is a diagram showing a prior sliding door.
Figure 17:
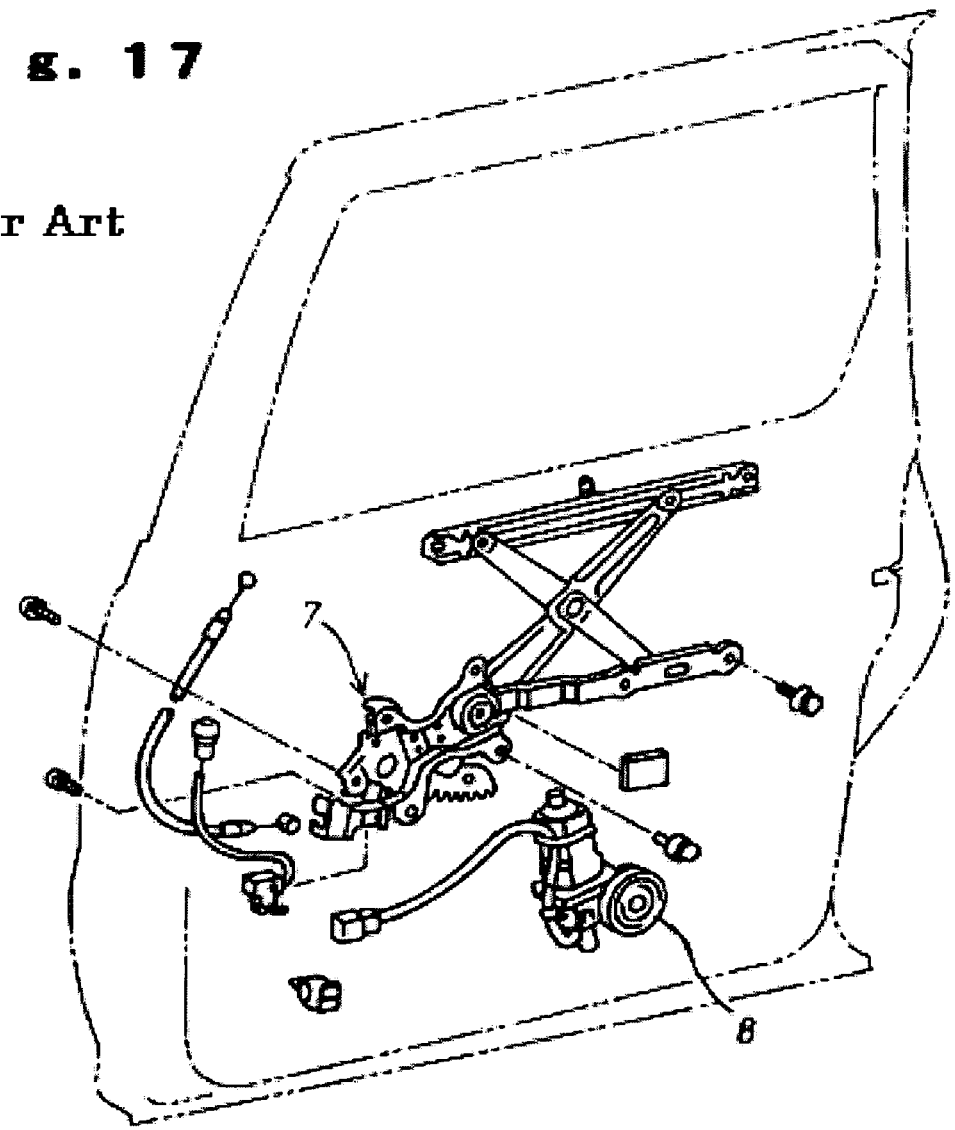
FIG. 17 is a diagram showing a mounting of a window regulator of the prior sliding door.

As shown in FIG. 15(a), a seal 97 covering the end portion of the cable 64 which transmits the up-and-down movement based on the outside handle 27 to the remote control mechanism 28 may be cuplike having no bellows. A wire 65 may be fitted into a bottom portion of the seal and may be caulked. A lower end opening of the seal may be opposite from the upper side to an opening of the coating tube 66 and the cable stopper 74 for fixing the coating tube 66. Further, as shown in FIG. 15(b), the coating tube 66 may be projected long from the portion which is fixed to the cable stopper 74 and the projected portion 98 may be covered by the seal 97. A seal 100 shown in FIG. 15(c) has a bellows which is formed at the upper side and a cylindrical notch 99 which the cable stopper 74 can go into is formed in the lower side at the end surface position being opposite to the cable stopper 74.

In the above mentioned embodiment, a case in which the present invention is applied to a sliding type door for a motor vehicle is described. However, it is able to apply the present invention to a door for a motor vehicle supported by a hinge pin and it is able to constitute a part of the inner panel as a module. Further, in the embodiment, the front side latch mechanism 24 is mounted to the module base 21. However, as substitute for the module base 21, the front side latch mechanism 24 may be mounted to the inner panel 12. Further, the front latch mechanism 24 may be eliminated and a sliding door 10 for a motor vehicle in which only the rear side latch mechanism 25 is provided may be constituted.

According to the embodiment, since the plurality of functional components are mounted to the module base almost without the bracket and are constituted as a module and it is able to adjust the operation as the module structure, it is able to decrease the number of parts and the weight. Further, it is able reduce the assembling time and cost by decrease the number of man-hour in assembling process of a vehicle and the number of parts.

Further, instead of mounting the inside handle and the remote control mechanism to which the movement of the inside handle is transmitted to the inner panel through the bracket, it is able to mount the inside handle and the remote control mechanism to the module base and the adjustment of the operation becomes easily. Further, it is able to decrease the number of parts and the weight and it is able reduce the assembling time and cost.

Further, according to the embodiment, instead of mounting the remote control mechanism and the locking actuator which is connected to the engagement mechanism of the remote control mechanism to the inner panel through the bracket, it is able to mount the remote control mechanism and the locking actuator to the module base and the adjustment of the operation becomes easily. Further, it is able to decrease the number of parts and the weight and it is able reduce the assembling time and cost.

Further, it is able to dispose the moving up and down actuator including the electric motor at the inside of the compartment and the assembling work becomes easily, and the waterproofing becomes best and it is able to decrease the malfunction.

What is claim is:

1. A door for a motor vehicle, comprising:
    an outer panel and an inner panel in which window portions are formed at their upper side region and which are connected at their peripheral portions, a space which is formed between the lower side region of the outer panel and the lower side region of the inner panel and in which a window glass for opening and closing the window portions is disposed so as to be able to move up and down,
    a module mounting opening formed on the lower side region of the inner panel and
    a module structure constituted by mounting a plurality of components including at least a remote control mechanism for transmitting a movement of an inside handle operated for opening and closing the door to a latch mechanism for maintaining the door in closing state by engaging the door with a body to the inside of compartment of a module base,
    wherein the module base is fluid-tightly fixed to the module mounting opening at its peripheral portion and the module structure is mounted on the inner panel,
    wherein the door is a sliding type door and the remote control mechanism transmits the movement of the inside handle to a front side latch mechanism and a rear side latch for maintaining the door in a closed state by engaging the door with the body for moving the front side latch mechanism and the rear side latch mechanism to a door opening allowed position.

2. A door for a motor vehicle as recited in claim 1, wherein the inside handle is mounted at the inside of the compartment of the module base and is connected to the remote control mechanism.

3. A door for a motor vehicle as recited in claim 1, wherein the remote control mechanism includes an engagement mechanism for being intermittent a path transmitting the movement of the inside handle to the latch mechanism, and a locking actuator connected to the engagement mechanism and for operating the engagement mechanism mounted at the inside of the compartment of the module base.

4. A door for a motor vehicle as recited in claim 1 further comprising a link mechanism for supporting the window glass and for moving up and down the window glass and disposed at the outside of the compartment of the module base, a moving up and down actuator for driving the link mechanism and mounted at the inside of the compartment of the module base, an output member penetrating the module base and disposed at the outside of the compartment and a drive shaft for driving the link mechanism and rotatably supported on the module base, wherein the drive shaft is connected to the link mechanism at the outside of the compartment and is connected to the output member for constituting a window regulator.

5. A door for a motor vehicle, comprising:
    an outer panel and an inner panel in which window portions are formed at their upper side region and which are connected at their peripheral portions, a space which is formed between the lower side region of the outer panel and the lower side region of the inner panel and in which a window glass for opening and closing the window portions is disposed so as to be able to move up and down,
    a module mounting opening formed on the lower side region of the inner panel and
    a module structure constituted by mounting a plural functional components including at least a remote control mechanism for transmitting a movement of an inside handle operated for opening and closing the door to a latch mechanism for maintaining the door in closing state by engaging the door with a body to the inside of compartment of a module base,
    wherein the module base is fluid-tightly fixed to the module mounting opening at its peripheral portion and the module structure is mounted on the inner panel,
    wherein the module base is overlapped with the module mounting opening of the inner panel at the peripheral portion from the inside of the compartment and a hole for fitting a connecting member is extended upward and downward and is formed so as to isolate regionally the inner panel from the module base at a portion in which an upper side edge of the module mounting opening is located lower than an upper side edge of the module base.

6. A door for a motor vehicle, comprising:
    an outer panel and an inner panel in which window portions are formed at their upper side region and which are connected at their peripheral portions, a space which is formed between the lower side region of the outer panel and the lower side region of the inner panel and in which a window class for opening and closing the window portions is disposed so as to be able to move up and down,
    a module mounting opening formed on the lower side region of the inner panel and
    a module structure constituted by mounting a plural functional components including at least a remote control mechanism for transmitting a movement of an inside handle operated for opening and closing the door to a latch mechanism for maintaining the door in closing state by engaging the door with a body to the inside of compartment of a module base,
    wherein the module base is fluid-tightly fixed to the module mounting opening at its peripheral portion and the module structure is mounted on the inner panel,
    wherein a communicating hole is formed on the module base and a step portion which projects to the outside of the compartment is formed at the upper portion of the communicating hole, and a block in which a projection overlapping with the step portion is formed is fixed to the module base so as to close fluid-tightly the communicating hole by its peripheral portion and a hole for fitting a connecting member is formed on the projection upward and downward.

* * * * *

UNITED STATES PATENT AND TRADEMARK OFFICE
CERTIFICATE OF CORRECTION

PATENT NO. : 6,969,108 B2 Page 1 of 1
DATED : November 29, 2005
INVENTOR(S) : Ryoichi Fukumoto et al.

It is certified that error appears in the above-identified patent and that said Letters Patent is hereby corrected as shown below:

Column 10,
Line 42, "class" should read -- glass --.

Signed and Sealed this

Fourth Day of April, 2006

JON W. DUDAS
*Director of the United States Patent and Trademark Office*